(12) United States Patent
Liu et al.

(10) Patent No.: US 12,468,868 B2
(45) Date of Patent: Nov. 11, 2025

(54) METHOD AND APPARATUS FOR DETERMINING SYNCHRONIZATION TRANSIENT STABILITY OF POWER SYSTEM

(71) Applicant: Tsinghua University, Beijing (CN)

(72) Inventors: Feng Liu, Beijing (CN); Peng Yang, Beijing (CN); Shiyong Wu, Beijing (CN); Peixin Yu, Beijing (CN); Chen Shen, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 884 days.

(21) Appl. No.: 17/719,345

(22) Filed: Apr. 12, 2022

(65) Prior Publication Data
US 2023/0195961 A1 Jun. 22, 2023

(30) Foreign Application Priority Data
Dec. 17, 2021 (CN) .......................... 202111553917.0

(51) Int. Cl.
H02J 3/00 (2006.01)
G06F 30/20 (2020.01)
G06F 111/10 (2020.01)

(52) U.S. Cl.
CPC .......... *G06F 30/20* (2020.01); *H02J 3/00125* (2020.01); *G06F 2111/10* (2020.01); *H02J 2203/20* (2020.01)

(58) Field of Classification Search
CPC .. G06F 30/20; G06F 2111/10; G06F 2119/06; H02J 3/00125; H02J 2203/20; H02J 3/00; H02J 3/24; H02J 3/242; H02J 2203/10; Y04S 10/50; G06Q 10/0639; G06Q 50/06
See application file for complete search history.

(56) References Cited

U.S. PATENT DOCUMENTS

2016/0041232 A1\* 2/2016 Mitra ...................... H02J 3/001
702/58

FOREIGN PATENT DOCUMENTS

CN 103473478 A 12/2013

OTHER PUBLICATIONS

Michel et al. Power System Transient Stability Using Individual Machine Energy Functions IEEE Transactions on Circuits and Systems, vol. CAS-30, No. 5, May 1983 (Year: 1983).\*

(Continued)

*Primary Examiner* — Rehana Perveen
*Assistant Examiner* — Cuong V Luu
(74) *Attorney, Agent, or Firm* — Hodgson Russ LLP

(57) ABSTRACT

A method for determining synchronization transient stability of a power system and an electronic device are provided. The synchronous energy function corresponding to the power system model is determined; the synchronization convergence region is determined according to the synchronization energy function; it is determined whether the power system is transient stable according to the synchronization convergence region and the initial value of power system after fault; and adjusting parameters of the power system in response to determining that the power system is transient unstable.

18 Claims, 3 Drawing Sheets

(56) References Cited

OTHER PUBLICATIONS

Pei et al. Modeling and Transient Synchronous Stability Analysis for PLL-Based Renewable Energy Generator Considering Sequential Switching Schemes IEEE Transactions on Power Electronics, vol. 37, No. 2, Feb. 2022 (Year: 2022).*
CNIPA, Office Action for CN Application No. 202111553917.0, Oct. 28, 2022.

* cited by examiner

METHOD AND APPARATUS FOR DETERMINING SYNCHRONIZATION TRANSIENT STABILITY OF POWER SYSTEM

CROSS-REFERENCE TO RELATED APPLICATION

This application claims priority to Chinese Patent Application No. 202111553917.0, filed on Dec. 17, 2021, the entire content of which is incorporated by reference herein.

TECHNICAL FIELD

The disclosure relates to the technical field of analyzing and monitoring the power system stability, and particularly to a method and apparatus for determining synchronization transient stability of a power system.

BACKGROUND

In the related art, there are two methods for analyzing the transient stability of a power system, i.e., a time-domain simulation method and a direct method. In the time-domain simulation method, a trajectory of the power system after fault is obtained through simulation calculation, thus determining the stability. The obtained results are accurate while the amount of calculation is often large since it is not necessary to know an equilibrium point after fault. In addition, the method cannot provide quantitative information such as a stability margin.

In the direct method, a stability region of the equilibrium point after fault is estimated and a certain critical function value (which is generally called a critical energy) is calculated by constructing a Lyapunov function or an energy function. When the initial energy after fault is smaller than the critical energy, it can be determined directly that large disturbance of the power system is stable. The direct method avoids the time-consuming simulation calculation, and can provide quantitative information such as a stability margin. However, the direct method is directed to a stability analysis of the equilibrium point after a specific fault. That is, the direct method is "related" to the equilibrium point. In this method, the equilibrium point of the system after fault needs to know in advance, but the equilibrium point after fault is often difficult to predict in advance at least for three aspects. Firstly, the power system is complex in dynamics and large in scale. Secondly, a high proportion of new energy may lead to working point fluctuation. Thirdly, the equilibrium point of the power system after fault is not unique or even non-isolated, so it is difficult to predict in advance which equilibrium point the trajectory will converge to after fault. The above problems lead to severe challenges in the practical application of the direct method that is "related" to the equilibrium point.

With the access of a large number of new energy and power electronic devices, the transient stability of power system becomes more and more difficult. Furthermore, the fluctuation of new energy and the complexity of system dynamics make it more and more difficult to predict the equilibrium point after fault. In this context, it is an urgent problem to be solved how to access the synchronization transient stability of power system without knowing specific information of the equilibrium point after fault.

SUMMARY

According to a first aspect of the disclosure, a method for determining synchronization transient stability of a power system includes: determining a synchronous energy function corresponding to a power system model; determining a synchronization convergence region based on the synchronization energy function; determining whether the power system is transient stable based on an initial value of the power system after fault and the synchronization convergence region; and adjusting parameters of the power system in response to determining that the power system is transient unstable. The synchronous energy function is determined based on state variables and algebraic variables of the power system, and meets the formula of $$\alpha(\|\eta(x,z)\|) \leq \mathcal{V}(x,z) \leq \beta(\|\xi(x,z)\|)$$

$$\dot{\mathcal{V}}(x,z) \leq -\gamma(\|\xi(x,z)\|)$$

$$\|h(x,z)\| \leq c\|\eta(x,z)\|,$$

where $\mathcal{V}(x,z)$ is a continuously differentiable synchronous energy function at $\mathcal{V}: \mathbb{R}^n \times \mathbb{R}^m \to \mathbb{R}$ for $(x,z) \in \mathcal{D}_G$, x is the state variables of the power system, z is the algebraic variables of the power system, $\mathbb{R}^n$ is a n dimensional Euclidean space, $\mathbb{R}^m$ is a m dimensional Euclidean space; $\eta(\ )$ and $\xi(\ )$ and are vector functions meeting $\eta: \mathbb{R}^n \times \mathbb{R}^m \to \mathbb{R}^{n_\eta}$ and $\xi: \mathbb{R}^n \times \mathbb{R}^m \to \mathbb{R}^{n_\xi}$; each of $\alpha(\ )$, $\beta(\ )$ and $\gamma(\ )$ is a $\mathcal{K}$-class function; c is a constant greater than or equal to 0, h represents a continuously differentiable function at a set $\mathcal{D} \subset \mathbb{R}^n \times \mathbb{R}^m$ and $$\frac{d}{dt}z = h(x, z),$$

the set $\mathcal{D}$ is a connected open set and meets an algebraic nonsingular condition, the $\mathcal{K}$-class function is a continuous function $\alpha:[0\alpha) \to [0, \infty)$, and $\alpha(0)=0$ when the continuous function increases monotonically.

According to a second aspect of the disclosure, an electronic device includes a processor and a memory stored with instructions executable by the processor. When the instructions are executed by the processor, the processor is caused to perform the method as described in the first aspect of the disclosure.

The additional aspects and advantages of the disclosure may be set forth in the following specification, and will become obvious from the following description, or may be learned by practice of the disclosure.

BRIEF DESCRIPTION OF THE DRAWINGS

The above and/or additional aspects and advantages of the present disclosure may be obvious and easily understood in descriptions of embodiments in combination with figures.

DETAILED DESCRIPTION

Figure 1:
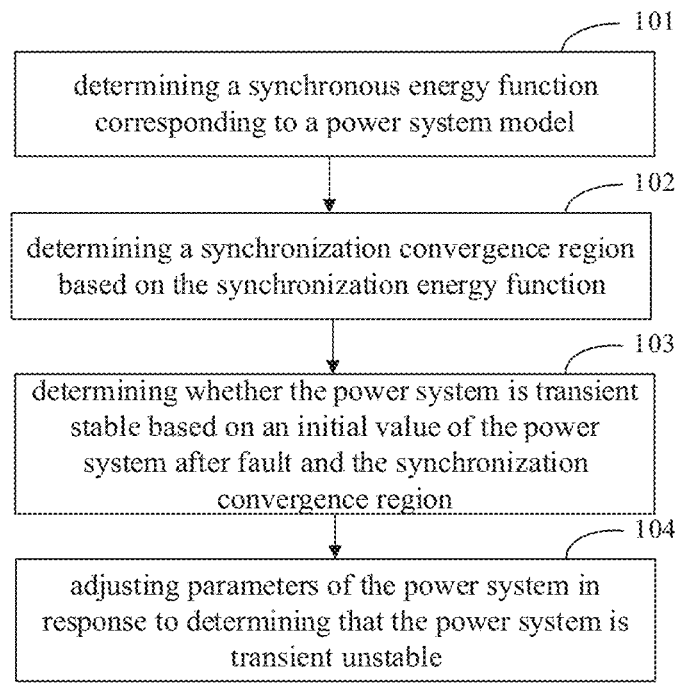
FIG. 1 is a flowchart of a method for determining synchronization transient stability of a power system according to an embodiment of the disclosure.

Embodiments of the disclosure are described in detail below, and examples of embodiments are illustrated in the accompanying drawings, in which the same or similar reference numbers represent the same or similar elements or elements with the same or similar functions. The embodiments described below with reference to the drawings are exemplary, are intended to explain the present disclosure and are not to be construed as a limitation of the disclosure.

It should be noted that at present, the transient stability of power system has been mathematically studied through the Lyapunov stability theory framework. Under this theoretical framework, the power system after fault is modeled as a set of ordinary differential equations (ODEs) or differential algebraic equations (DAEs). The equilibrium point of the equations corresponds to the equilibrium point of the power system after fault.

According to some examples, the direct method transforms the transient stability problem into the Lyapunov Asymptotical Stability problem for the equilibrium point. According to the relevant mathematical conclusions, any solution starting from the stability region of the asymptotically stable equilibrium point will asymptotically converge to such equilibrium point. Therefore, if the equilibrium point after fault is asymptotically stable and an initial energy after fault is within its stability region, the transient stability of the power system after disturbance can be accessed. In specific applications, since the real stability region of the equilibrium point is often difficult to be accurately determined, a conservative judgment on the transient stability is obtained generally by looking for an inner approximation of the stability region.

In some embodiments, the existing direct methods, such as a boundary of stability based controlling unstable equilibrium point (BCU) method, a potential energy boundary surface (PUBS) method and the like, an appropriate Lyapunov function or energy function is first constructed based on a system model, and a stability region is then estimated through a level set of the function. However, the existing direct method needs to know the equilibrium point after fault, the stability region studied is also a stability region only effective for the equilibrium point, and the result is only the stability region estimation of a single equilibrium point. That is, it can be only accessed whether the system trajectory converges to a predetermined single equilibrium point after fault. Therefore, the direct method is an equilibrium point-related method and is thus not applicable when the equilibrium point after fault is unknown or when there are multiple possible equilibrium points after fault.

It should be noted that, the synchronous state refers to a state in which a voltage phasor amplitude of each node in the whole power system is constant and each node rotates synchronously at the same frequency. The synchronous state is a state required by all AC power systems for stable operation. The synchronous state itself is independent of the equilibrium point. The synchronization transient stability refers to an ability of the power system for maintaining stable operation after suffering from serious disturbances such as short-circuit fault. The instability of the power system may lead to a large-scale power outage and serious economic losses. Therefore, it is of great significance to ensure the stability of power system as a basis of normal operation of the power system. In order to check whether the power system may maintain a stable synchronous state after the expected fault occurs (i.e., check and verify the synchronization transient stability of the power system), the present disclosure provides an equilibrium-independent method for determining synchronization transient stability of a power system, so as to provide guidance for the operation plan and the control design of the power system.

The present disclosure is described in detail below in combination with specific embodiments.

FIG. 1 is a flowchart of a method for determining synchronization transient stability of a power system according to an embodiment of the disclosure. As shown in FIG. 1, the method of the disclosure includes the following steps at 101-104.

At 101, a synchronous energy function corresponding to a power system model is determined.

In an embodiment of the disclosure, before determining a synchronous energy function corresponding to a power system model, the method further includes: determining the power system model; and determining state variables of the power system based on the power system model.

Considering a structure preserving model in the power system, the power system model is described by the following differential algebraic equations (DAEs) which are expressed in the formula (1-1)

$$\begin{cases} \dot{x}_1 = f_1(x_1, x_2, z) \\ \dot{x}_2 = f_2(x_1, x_2, z) \\ 0 = g(x_2, z) \end{cases} \quad (1\text{-}1)$$

$$z = col(\theta, V) \in \mathbb{R}^m$$

$$x_1 \in \mathbb{R}^{n_1}, x_2 \in \mathbb{R}^{n_2}$$

where $x_1$ and $x_2$ represent sub-state variables of the power system, $\mathbb{R}^{n_1}$ is a $n_1$ dimensional Euclidean space, $\mathbb{R}^{n_2}$ is a $n_2$ dimensional Euclidean space, z is algebraic variables of the power system, $\theta$ is a phase angle of each node in the power system, V is a voltage amplitude of each node in the power system; the function col( ) is a column vector splicing function, $f_1(\ )$, $f_2(\ )$ and g( ) are quadratic continuous differentiable functions.

In an embodiment of the present disclosure, determining the state variables of the power system based on the power system model includes: determining the state variables of the power system based on the sub-state variables of the power system. The state variables x of the power system is determined based on the following formula (1-2).

$$x := col(x_1, x_2) \in \mathbb{R}^n$$

$$n = n_1 + n_2$$

$$col(x_1, x_2) = (x_1^T, x_2^T)^T \quad (1\text{-}2)$$

In an embodiment of the present disclosure, determining the synchronous energy function corresponding to the power system model includes: determining the synchronous energy function based on the state variables and the algebraic variables of the power system. At the same time, the synchronous energy function meet the following formula (1-3).

$$\alpha(\|\eta(x,z)\|) \leq \mathcal{V}(x,z) \leq \beta(\|\xi(x,z)\|)$$

$$\dot{\mathcal{V}}(x,z) \leq -\gamma(\|\xi(x,z)\|)$$

$$\|h(x,z)\| \leq c\|\eta(x,z)\| \tag{1-3}$$

$\mathcal{V}(x,z)$ is a continuously differentiable synchronous energy function at $\mathcal{V}: \mathbb{R}^n \times \mathbb{R}^m \to \mathbb{R}$ for $(x,z) \in \mathcal{D}_G$, $\eta(\ )$ and $\xi(\ )$ are vector functions meeting $\eta$: $\mathbb{R}^n \times \mathbb{R}^m \to \mathbb{R}^{n_\eta}$ and $\xi$: $\mathbb{R}^n \times \mathbb{R}^m \to \mathbb{R}^{n_\xi}$. Each of $\alpha(\ )$, $\beta(\ )$ and $\gamma(\ )$ is a $\mathcal{K}$-class function. The $\mathcal{K}$-class function is a continuous function $\alpha:[0, \alpha) \to [0, \infty)$, and $\alpha(0)=0$ when the continuous function increases monotonically. c is a constant meeting c≥0. h( ) is a continuously diffrerentiable function at a set $\mathcal{D} \subset \mathbb{R}^n \times \mathbb{R}^m$ and $$\frac{d}{dt} z = h(x, z),$$

which is expressed by the formula (1-4). The set $\mathcal{D}$ is a connected open set and meets an algebraic nonsingular condition.

$$h(x,z) := -\left(\frac{\partial g}{\partial z}(x_2, z)\right)^{-1} \frac{\partial g}{\partial x_2}(x_2, z) f_2(x, z) \tag{1-4}$$

In an embodiment, it is defined that a set $\mathcal{D} \subset \mathbb{R}^n \times \mathbb{R}^m$ is a connected open set that meets the algebraic nonsingular condition. That is, for $(x,z) \in \overline{\mathcal{D}}$, $$\det\left(\frac{\partial g}{\partial z}\right) \neq 0,$$

where $\overline{\mathcal{D}}$ is a closure of $\mathcal{D}$ and det( ) represents a matrix determinant.

At 102, a synchronization convergence region is determined based on the synchronization energy function.

In an embodiment of the disclosure, determining the synchronization convergence region based on the synchronization energy function includes: determining a critical energy value of the synchronization energy function; determining a level set of the critical energy value; and determining the synchronization convergence region based on the level set.

The critical energy value is determined as $l \in \mathbb{R}$ so that $\mathcal{V}_l^{-1} \subset \mathcal{D}_G$. The greater the critical energy value l, the lower the conservative property.

In an embodiment, the level set $\mathcal{V}_l^{-1}$ is defined in the formula (1-5), where G is a set of points that meet an algebraic constraint $0=g(x_2, z)$, $\mathbb{R}^n$ n is a n dimensional Euclidean space, $\mathbb{R}^m$ is a m dimensional Euclidean space. When all the sub-state variables of the power system appear in the algebraic constraint $0=g(x_2, z)$, then $x_1=\emptyset$.

$$\mathcal{V}_l^{-1} := \{(x,z) \in \mathbb{R}^n \times \mathbb{R}^m \mid \mathcal{V}(x,z) \leq l\} \cap G$$

$$G := \{(x,z) \in \mathbb{R}^n \times \mathbb{R}^m \mid g(x_2,z)=0\} \tag{1-5}$$

For any initial value $(x_0, z_0) \in G$ of the power system after fault, a solution for the stricture preserving model of power system is $(x(t;x_0, z_0), z(t; x_0, z_0))$. When the initial value is clarified. the solution for the structure preserving model of power system is abbreviated as $(x(t), z(t))$.

In the embodiments of the disclosure, the structure preserving model of power system meets an algebraic nonsingular condition. The problem of short-time voltage collapse in the power system under the algebraic singularity does not belong to the scope of the embodiment of the disclosure.

It should be noted that, algebraic non-singularity guarantees some regularity of differential algebraic equations, which is called an index-1 property. At nonsingular points, the algebraic variables can be locally expressed as a function of state variables according to the implicit function theorem, and the derivatives of algebraic variables are well defined. When the power system is in a normal operation or in a general fault, the power system model often meets the algebraic non-singularity.

Furthermore, a set of equilibrium points of the power system meeting the algebraic nonsingular condition is determined according to the following formula (1-6).

$$\varepsilon := \{(x,z) \in \mathcal{D}_G \mid f(x,z)=0\}$$

$$\mathcal{D}_G := \mathcal{D} \cap G \tag{1-6}$$

It should be noted that, synchronization of the power system refers to frequency synchronization and voltage convergence of each node in the power system, and it is defined mathematically as $\dot{z}(t)=\text{col}(\dot{\theta}(t), \dot{V}(t))=0$ for t≥0 and $(x(t), z(t)) \in \mathcal{D}_G$. Further, when the power system after fault recovers to the synchronous state (i.e., having the synchronization transient stability), it is defined mathematically as $\dot{z}(t)=\text{col}(\dot{\theta}(t), \dot{V}(t)) \to 0$ for t≥0, t→∞ and $(x(t), z(t)) \in \mathcal{D}_G$.

At 103 it is determined whether the power system is transient stable based on an initial value of the power system after fault and the synchronization convergence region.

In an embodiment of the disclosure, determining whether the power system is transient stable based on the initial value of the power system after fault and the synchronization convergence region includes: in response to the initial value of the power system after fault being in the synchronization convergence region, determining that the power system is transient stable; and in response to the initial value of the power system after fault being not in the synchronization convergence region, determining that the power system is transient unstable.

In another embodiment of the disclosure, determining whether the power system is transient stable based on the initial value of the power system after fault and the synchronization convergence region includes: determining a synchronous energy value corresponding to the initial value of the power system after fault based on the synchronization energy function; in response to the synchronous energy value being not greater than the critical energy value, determining that the power system is transient stable; and in response to the synchronous energy value being greater than the critical energy value, determining that the power system is transient unstable.

In particular, if $\mathcal{V}(x_0, z_0) \leq 1$, $(x_0, z_0)$ falls into the synchronization convergence region and it can be determined that the power system is transient stable; if $\mathcal{V}(x_0, z_0) > 1$, $(x_0, z_0)$ does not fall into the synchronization convergence region and it can be determined that the power system is transient unstable.

At 104, parameters of the power system are adjusted in response to determining that the power system is transient unstable.

In an embodiment, when it is determined that the power system is transient unstable, the parameters of the power system need to be adjusted, such as a transmission line impedance, a transmitting power, filter parameters in the power system, to improve the synchronization transient stability of the power system.

Figure 2:
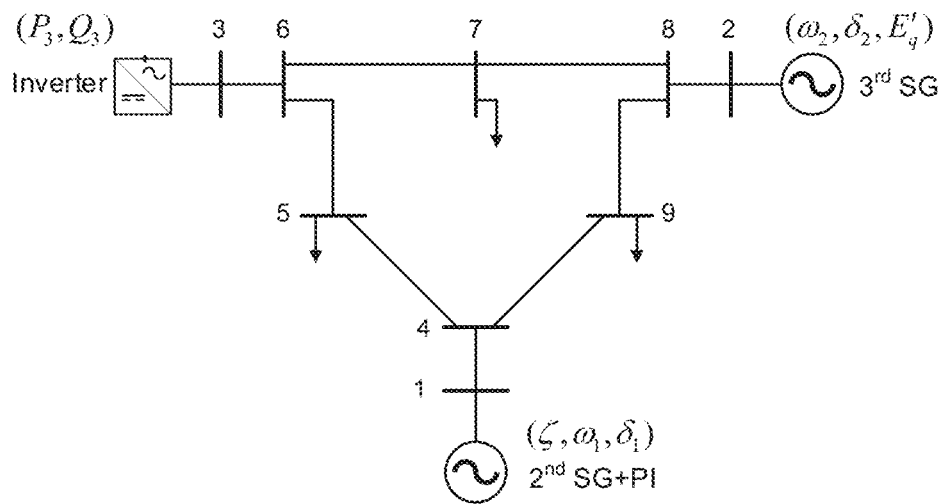
FIG. 2 is a structural schematic diagram illustrating an IEEE-9 node power system according to an embodiment of the disclosure.

FIG. 2 is a structural schematic diagram illustrating an IEEE-9 node power system according to an embodiment of the disclosure. As shown in FIG. 2, each of node 1 and node 2 is connected with a synchronous generator, node 3 is connected with an electronic power supply, node 5, node 7 and node 9 are constant power loads. Taking an IEEE-9 node power system shown in FIG. 2 as an example, the method for determining synchronization transient stability of a power system is described as follows.

Generator Dynamic at Node 1

Assuming that the synchronous generator connected to node 1 has strong excitation control, so that the internal potential is approximately constant in the transient process and a speed regulation controller is provided at node 1 to recover a system frequency, the dynamic of the synchronous generator connected to node 1 is then determined in the formula (2-1).

$$\begin{cases} \dot{\delta}_1 = \omega_1 \\ M_1\dot{\omega}_1 = -D_1\omega_1 - P_1^e + P_1^g \end{cases} \quad (2\text{-}1)$$

$$P_1^g = P_1^{g0} + u$$

$$u(t) = k_1\omega(t) - k_2 \int_0^t \omega(\tau)d\tau$$

where $M_1 > 0$ is an inertia of the synchronous generator connected to node 1, $D_1 > 0$ is a damping of the synchronous generator connected to node 1, $P_1^g$ is an input power controlled by proportional integral (PI) speed regulation, $P_1^{g0}$ is a fixed mechanical input power, and u is a PI control of frequency deviation.

The state variables $\zeta$ are introduced, and u(t) can be expressed in an equivalent differential form of $$\dot{\zeta} = -k_2\omega, u = -k_1\omega + \zeta$$

Therefore, the active power $P_1^e$ and the reactive power $Q_1^e$ output by the synchronous generator connected to node 1 are expressed by $$P_1^e = \frac{EV_1\sin(\delta_1 - \theta_1)}{x'_{d1}}, \ Q_1^e = \frac{EV_1\cos(\delta_1 - \theta_1)}{x'_{d1}} - \frac{1}{x'_{d1}}V_1^2$$

where E is an internal potential of the synchronous generator connected to node 1 and $E > 0$, $x'_{d1}$ is a d-axis transient reactance, $V_1\angle\theta_1$ is a terminal voltage at node 1.

Generator Dynamic at Node 2

The dynamic of the synchronous generator connected to node 2 can be described by third-order equations in the formula (2-2).

$$\begin{cases} \dot{\delta}_2 = \omega_2 \\ M_2\dot{\omega}_2 = -D_2\omega_2 - P_2^e + P_2^g \\ T'_{d0}\dot{E}'_q = -\frac{x_{d2}}{x'_{d2}}E'_q + \frac{(x_{d2} - x'_{d2})V_2\cos(\delta_2 - \theta_2)}{x'_{d2}} + E_2^f \end{cases} \quad (2\text{-}2)$$

where, $M_2 > 0$ is an inertia of the synchronous generator connected to node 2, $D_2 > 0$ is a damping of the synchronous generator connected to node 2, $P_2^g > 0$ is a constant mechanical power input, $E_2^f > 0$ is a constant excitation voltage, $T'_{d0} > 0$ is a transient time constant in a d-axis open circuit, $E'_q$ is a q-axis transient voltage, $x_{d2}$ is a d-axis synchronous reactance of the synchronous generator connected to node 2, $x'_{d2}$ is a d-axis transient reactance of the synchronous generator connected to node 2.

Therefore, the active power $P_2^e$ and the reactive power $Q_2^e$ output by the synchronous generator connected to node 2 are expressed by $$P_2^e = \frac{V_2^2\sin[2(\delta_2 - \theta_2)](x'_{d2} - x_{q2})}{2x_{q2}x'_{d2}} + \frac{E'_q V_2\sin(\delta_2 - \theta_2)}{x'_{d2}}$$

$$Q_2^e = \frac{V_2^2\cos[2(\delta_2 - \theta_2)](x'_d - x_q)}{2x_{q2}x'_{d2}} + \frac{E'_q V_2\cos(\delta_2 - \theta_2)}{x'_{d2}} - \frac{x'_{d2} + x_{q2}}{2x_{q2}x'_{d2}}V_2^2$$

where $x_{q2}$ is a q-axis synchronous reactance of the synchronous generator connected to node 2, and $V_2\angle\theta_2$ is a terminal voltage at node 2.

Dynamic at Node 3

The node 3 is provided with a power source equipment with a power electronic interface. The output power is adjusted by droop control of the node voltage. The specific dynamic equation at node 3 is expressed by the formula (2-3).

$$\begin{cases} \tau_1\dot{P}_3 = -P_3 + P_3^{ref} - d_1(\theta_3 - \theta_3^{ref}) \\ \tau_2\dot{Q}_3 = -Q_3 + Q_3^{ref} - d_2(V_3 - V_3^{ref}) \end{cases} \quad (2\text{-}3)$$

where $\tau_1$, $\tau_2$ are time constants $\tau_1$, $\tau_2 > 0$; $d_1$, $d_2$ are droop coefficients and $d_1$, $d_2 > 0$; $P_3$ is an active power output by node 3, $Q_3$ is a reactive power output by node 3, $V_3\angle\theta_3$ is a voltage at node 3, and the superscript ref represents a set value of the corresponding variable.

Power System Model and State Variables

An algebraic equation set is firmed in the formula (2-4) when each node of the power system meet power balance constraints.

$$\begin{cases} P_i = G_{ii}V_i^2 + \sum_{j\in N_i} V_iV_j(B_{ij}\sin\theta_{ij} + G_{ij}\cos\theta_{ij}) \\ Q_i = -B_{ii}V_i^2 - \sum_{j\in N_i} V_iV_j(B_{ij}\cos\theta_{ij} - G_{ij}\sin\theta_{ij}) \end{cases}, \quad (2\text{-}4)$$

$$i = 1, 2, \ldots, 9$$

where $P_i$ is a net active power at node i, $Q_i$ is a net reactive power at node i, $\theta_{ij} = \theta_i - \theta_j$ is a phase angle difference, $G_{ij}$, $B_{ij}$ are elements in a network admittance matrix of the power system.

The power system model is determined based on the algebraic equation set and the dynamics of node 1, node 2 and node 3. Then the state variables of the power system may be obtained based on the power system model:

$$x = \text{col}(\zeta, \omega_1, \delta_1, \omega_2, \delta_2, E'_q, P_3, Q_3)$$

Estimation of a Synchronization Convergence Region

Firstly, a synchronization energy function corresponding to the IEEE-9 node power system is determined by the formula (2-5).

$$v(x, z) = f(x, z)^T P f(x, z) \quad (2\text{-}5)$$

$$P = \begin{bmatrix} 1.136 & -0.049 & 0.026 & 0.225 & -0.049 & -0.050 & -0.507 & -0.066 \\ -0.049 & 0.719 & -0.151 & -0.237 & -0.041 & -0.077 & 0.005 & 0.052 \\ 0.026 & -0.151 & 0.497 & -0.060 & 0.131 & 0.350 & -0.053 & 0.174 \\ 0.225 & -0.237 & -0.060 & 1.070 & -0.146 & 0.096 & 0.006 & -0.047 \\ -0.049 & -0.041 & 0.131 & -0.146 & 0.461 & -0.302 & 0.073 & -0.143 \\ -0.050 & -0.077 & 0.350 & 0.096 & -0.302 & 0.651 & -0.012 & 0.304 \\ -0.507 & 0.005 & -0.053 & 0.006 & 0.073 & -0.012 & 0.530 & 0.038 \\ -0.066 & 0.052 & 0.174 & -0.047 & -0.143 & 0.304 & 0.038 & 0.463 \end{bmatrix}$$

The level set $V_4^{-1}$ for the critical energy value l=4 is taken as the estimation of the synchronous convergence region. This level set is an 8-dimensional submanifold in a 26-dimensional Euclidean space and is projected to a 2-dimensional plane $\xi$–$\omega_1$ to obtain an ellipse shown in FIG. 3.

Assessment of Synchronization Transient Stability

In response to an initial value of the power system after fault being within the estimated synchronization convergence region, it can be determined that the power system is transient stable.

Figure 3:
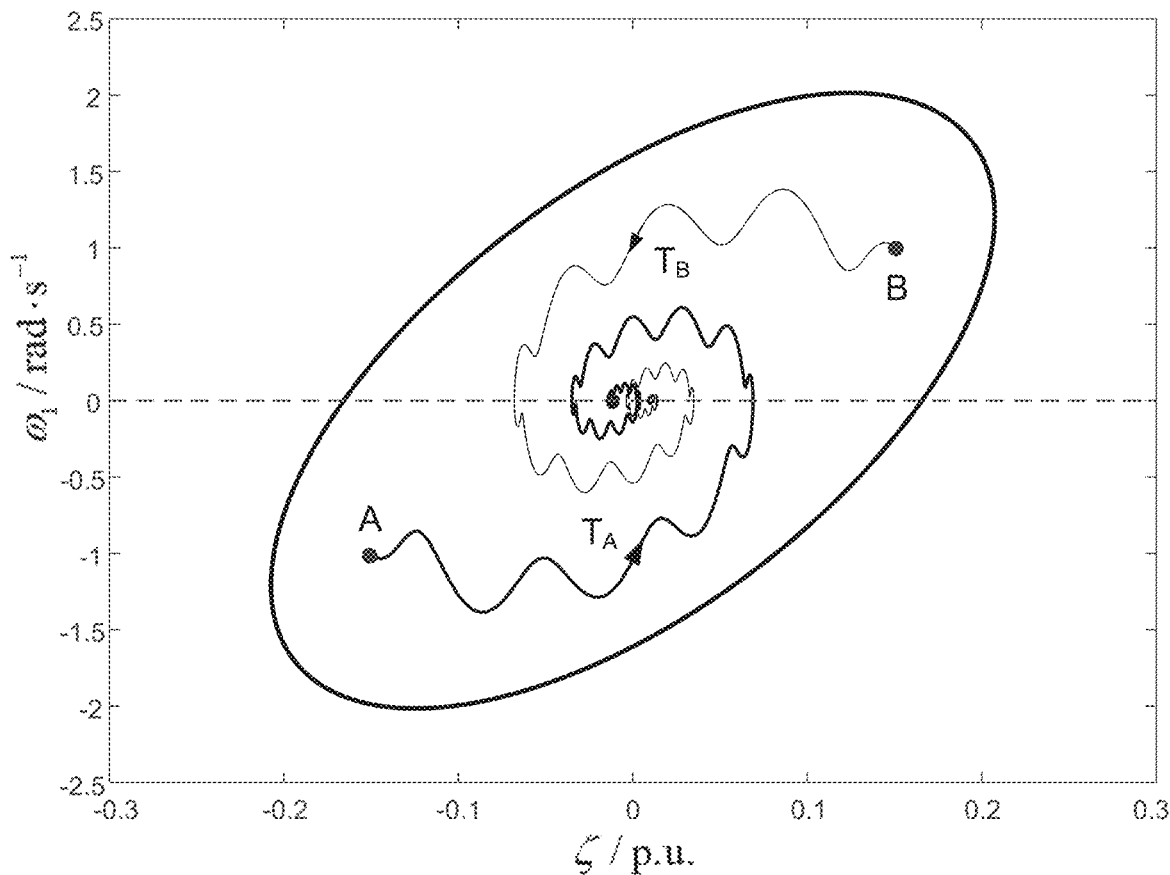
FIG. 3 is a schematic diagram illustrating a projection of the estimated synchronous convergence region on a 2D plane according to an embodiment of the disclosure.

FIG. 3 is a schematic diagram illustrating a projection of the estimated synchronous convergence region on a 2D plane according to an embodiment of the disclosure. As shown in FIG. 3, two points A and B in the synchronization convergence region represents the projection of initial points of the IEEE-9 node power system after two faults on the plane $\xi$–$\omega_1$, respectively. The coordinates of point A is (−0.15, −1) and the coordinates of point B is (0.15, 1) in the 2D plane. The trajectory $T_A$ after the $1^{st}$ fault starts from the initial point A. The trajectory $T_B$ after the $2^{nd}$ fault starts from the initial point B. The two trajectories are both converged to a synchronous state that is indicated as $\omega_1=0$ on the plane $\xi$–$\omega_1$.

However, the equilibrium point to which the trajectory $T_A$ is converged is different from that to which the trajectory $T_B$. This indicates that the proposed method in the disclosure is not dependent of (and is not limited to) the equilibrium point after a certain fault, can solve the stability analysis problem when the equilibrium point is unknown can also solve the stability analysis problem when there are multiple equilibrium points or the equilibrium points are not separate/isolated.

Therefore, the simulation results shown in FIG. 3 verify the effectiveness of the proposed method. With the proposed method in the disclosure, the power system after two faults may recover to the synchronous state, i.e., having the synchronization transient stability. Further, the proposed method in the disclosure may be applied for various complex cases without considering the equilibrium points.

Figure 4:
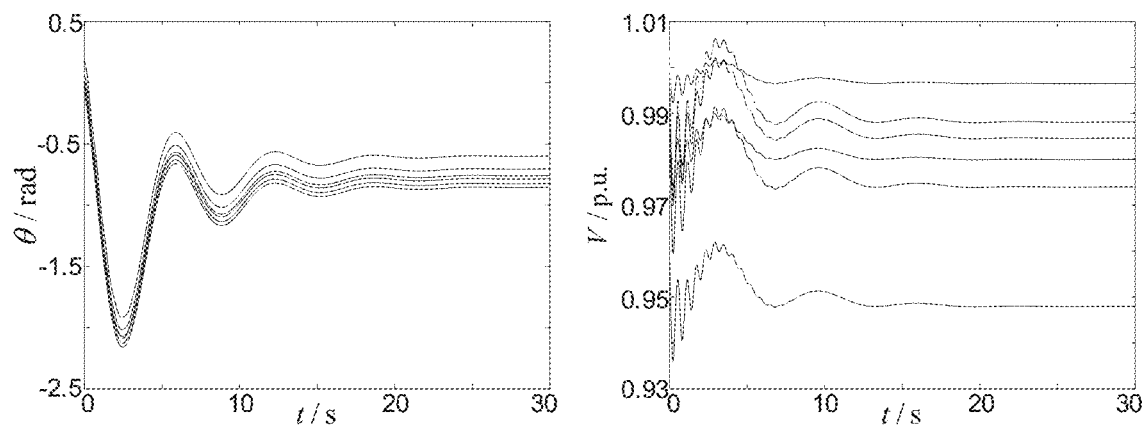
FIG. 4 is a waveform schematic diagram of voltage and phase angle changing with time for each node in a trajectory $T_A$ according to an embodiment of the disclosure.
Figure 5:
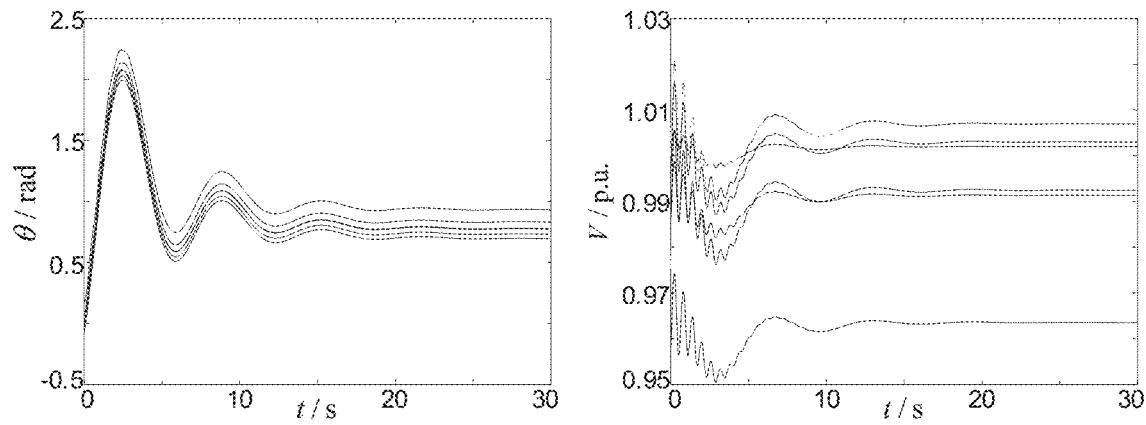
FIG. 5 is a waveform schematic diagram of voltage and phase angle changing with time for each node in a trajectory $T_B$ according to an embodiment of the disclosure.

FIG. 4 illustrates a waveform of voltage and phase angle changing with time for each node in a trajectory $T_A$ according to an embodiment of the disclosure. FIG. 5 illustrates a waveform of voltage and phase angle changing with time for each node in a trajectory $T_B$ according to an embodiment of the disclosure. As shown in FIG. 4 and FIG. 5, the power system after fault corresponding to the trajectory $T_A$ and the trajectory $T_B$ can recover to a state of frequency synchronization and voltage convergence. However, the phase angle value and voltage value of the waveform corresponding to the trajectory $T_A$ are different from those waveform corresponding to the trajectory $T_B$. This indicates that the equilibrium point after fault corresponding to the trajectory $T_A$ is different from that corresponding to the trajectory $T_B$.

In conclusion, with the proposed method in the embodiments of the disclosure, the synchronous energy function corresponding to the power system model is determined; the synchronization convergence region is determined according to the synchronization energy function; it is determined whether the power system is transient stable according to the synchronization convergence region and the initial value of power system after fault; and when the power system is transient unstable, parameters of the power system are adjusted. The disclosure can directly access the transient synchronization stability of the power system according to the initial value of the power system after fault without knowing the information of the equilibrium points after fault, which can reduce time-cons wiling simulation calculation, and can provide quantitative information such as a stability margin. Therefore, the disclosure can adapt to various types of dynamic devices and lossy networks, with wide application and strong engineering practicability.

In order to perform the above methods in the embodiments, an apparatus for determining synchronization transient stability of a power system is also proposed. The apparatus may be implemented by an electronic device, which is not limited to a mobile phone, a tablet computer, a wearable device and the like.

Figure 6:
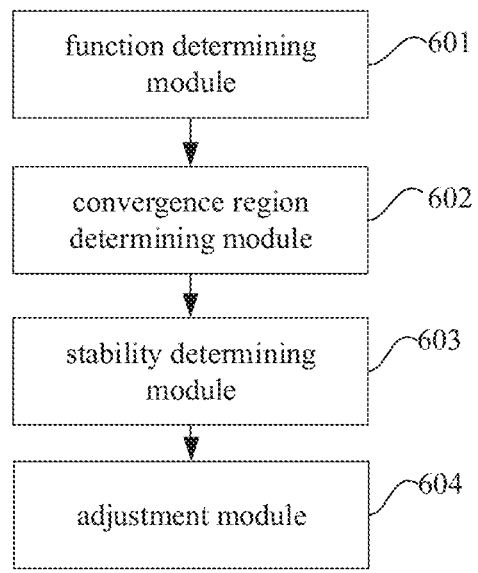
FIG. 6 is a structural schematic diagram illustrating an apparatus for determining synchronization transient stability of a power system according to an embodiment of the disclosure.

FIG. 6 is a structural schematic diagram illustrating an apparatus for determining synchronization transient stability of a power system according to an embodiment of the disclosure. The apparatus may include a function determining module 601, a convergence region determining module 602, a stability determining module 603 and an adjustment module 604.

The function determining module 601 is configured to determine a synchronous energy function corresponding to a power system model. The convergence region determining module 602 is configured to determine a synchronization convergence region based on the synchronization energy function. The stability determining module 603 is configured to determine whether the power system is transient stable based on an initial value of the power system after fault and the synchronization convergence region. The adjustment module 604 is configured to adjust parameters of the power system in response to determining that the power system is transient unstable.

With the above apparatus of the disclosure, the disclosure can directly access the transient synchronization stability of the power system according to the initial value of the power system after fault without knowing the information of the equilibrium points after fault, which can reduce time-consuming simulation calculation, and can provide quantitative information such as a stability margin. Therefore, the disclosure can adapt to various types of dynamic devices and lossy networks, with wide application and strong engineering practicability.

It should be noted that, the stability margin in the disclosure is configured to reflect a margin value away from the instability and measure the stability of the power system, and the stability margin may include an amplitude margin and a phase margin.

It should be noted that, the terms "first" and "second" are only for describing purposes and are not to be construed as indicating or implying relative importance or implicitly indicating the number of technical features indicated. Thus, features limiting "first" and "second" may explicitly or implicitly include at least one of the features. In the description of the disclosure, the wording "a plurality of" means at least two, for example, two, three, unless otherwise expressly and specifically stated.

Any process or method description in the flowchart or otherwise described herein may be understood to represent a module, fragment or part of code including one or more executable instructions for implementing the steps of a particular logical function or process, and the scope of the embodiments of the present disclosure includes additional implementations where the functions may be performed in in an order shown or discussed, or includes implementations where the functions may be performed in a basically simultaneous manner or in reverse order according to the involved functions, which may be understood by those skilled in the art.

It should be understood that various parts of the present disclosure may be implemented in hardware, software, firmware or their combination. In the above described embodiments, a plurality of steps or methods may be implemented with software or firmware stored in memory and executed by a suitable instruction execution system. For example, if they are implemented in hardware, as in another embodiment, it can be implemented by any of the following technologies known in the art or their combination: discrete logic circuits with logic gate circuits for realizing logic function of data signals, application specific integrated circuits with appropriate combined logic gate circuits, a programmable gate array (PGA), a field programmable gate array (FPGA), etc.

Those skilled in the art can understand that all or part of the steps included in the above method embodiments can be completed by instructing relevant hardware through a program. The program can be stored in a non-transitory computer-readable storage medium. When the program is executed by a processor, the processor is caused to perform the steps of the method.

In addition, each functional unit in each embodiment of the disclosure can be integrated into one processing module, each unit can exist separately, or two or more units can be integrated into one module. The above integrated modules can be realized in the form of hardware or software function modules. If the integrated module is realized in the form of software function module and sold or used as an independent product, it can also be stored in a computer-readable storage medium. The storage medium mentioned above can be a read only memory, a magnetic disk or an optical disc.

In the description of the specification, descriptions with reference to terms "an embodiment", "some embodiments", "example", "specific example" or "some examples" mean specific features, structures, materials or characteristics described in combination with the embodiment or example are included in at least an embodiment or example of the disclosure. In this specification, the schematic representations of the above terms do not have to be the same embodiment or example. Moreover, specific features, structures, materials or characteristics described may be combined in one or more embodiments or examples in a suitable manner. Furthermore, embodiments or examples described in the specification, as well as features of embodiments or examples, may be combined without conflicting with each other.

Although the embodiments of the disclosure have been illustrated and described above, it may be understood that the above-mentioned embodiments are exemplary and should not be construed as a limitation to the disclosure.

What is claimed is:

1. A method for determining transient synchronous stability of a power system, comprising:
   determining, by an electronic device, a synchronous energy function corresponding to a power system model;
   determining, by the electronic device, a synchronization convergence region based on the synchronous energy function;
   determining, by the electronic device, whether the power system is transient stable based on an initial value of the power system after fault and the synchronization convergence region; and
   adjusting, by the electronic device, parameters of the power system in response to determining that the power system is transient unstable, so that the power system is enabled to be transient stable;
   wherein determining the synchronous energy function corresponding to the power system model comprises:
      determining, by the electronic device, the synchronous energy function based on state variables and algebraic variables of the power system, wherein the synchronous energy function meets the formula of $$\alpha(\|\eta(x,z)\|) \leq \mathcal{V}(x,z) \leq \beta(\|\xi(x,z)\|)$$

$$\dot{\mathcal{V}}(x,z) \leq -\gamma(\|\xi(x,z)\|)$$

$$\|h(x,z)\| \leq c\|\eta(x,z)\|,$$

where $\mathcal{V}(x,z)$ is a continuously differentiable synchronous energy function at $\mathcal{V}:\mathbb{R}^n \times \mathbb{R}^m \to \mathbb{R}$ for $(x,z) \in \mathcal{D}_G$, x is the state variables of the power system, z is the algebraic variables of the power system, $\mathbb{R}^n$ is a n dimensional Euclidean space, $\mathbb{R}^m$ is a m dimensional Euclidean space; $\eta(\ )$ and $\xi(\ )$ are vector functions meeting $\eta: \mathbb{R}^n \times \mathbb{R}^m \to \mathbb{R}^{n_\eta}$ and $\xi: \mathbb{R}^n \times \mathbb{R}^m \to \mathbb{R}^{n_\xi}$; each of $\alpha(\ )$, $\beta(\ )$ and $\gamma(\ )$ is a $\mathcal{K}$-class function; c is a constant greater than or equal to 0, h represents a continuously differentiable function at a set $\mathcal{D} \subset \mathbb{R}^n \times \mathbb{R}^m$ and $$\frac{d}{dt}z = h(x,z),$$

the set $\mathcal{D}$ is a connected open set and meets an algebraic nonsingular condition,
   where the $\mathcal{K}$-class function is a continuous function $\alpha: [0, \alpha) \to [0, \infty)$, and $\alpha(0)=0$ when the continuous function increases monotonically.

2. The method according to claim 1, before determining, by the electronic device, the synchronous energy function corresponding to the power system model, the method further comprises:

determining, by the electronic device, the power system model; and determining, by the electronic device, the state variables of the power system based on the power system model.

3. The method according to claim 2, wherein the power system model is determined by the formula of $$\begin{cases} \dot{x}_1 = f_1(x_1, x_2, z) \\ \dot{x}_2 = f_2(x_1, x_2, z) \\ 0 = g(x_2, z) \end{cases}$$

$$z = col(\theta, V) \in \mathbb{R}^m$$

$$x_1 \in \mathbb{R}^{n_1}, x_2 \in \mathbb{R}^{n_2},$$

where $x_1$ and $x_2$ represent sub-state variables of the power system, $\mathbb{R}^{n_1}$ is a $n_1$ dimensional Euclidean space, $\mathbb{R}^{n_2}$ is a $n_2$ dimensional Euclidean space, z is algebraic variables of the power system, θ is a phase angle of each node in the power system, V is a voltage amplitude of each node in the power system; the function col( ) s a column vector splicing function, $f_1(\ )$, $f_2(\ )$ and g( ) re quadratic continuous differentiable functions.

4. The method according to claim 3, wherein determining the state variables of the power system comprises:

determining, by the electronic device, the state variables of the power system based on the sub-state variables of the power system with the formula of $$x := col(x_1, x_2) \in \mathbb{R}^n$$

$$n = n_1 + n_2$$

$$col(x_1, x_2) = (x_1^T, x_2^T)^T$$

where x is the state variables of the power system and $\mathbb{R}^n$ is a n dimensional Euclidean space.

5. The method according to claim 1, wherein the function h( ) is defined as:

$$h(x, z) := -\left(\frac{\partial g}{\partial z}(x_2, z)\right)^{-1} \frac{\partial g}{\partial x_2}(x_2, z) f_2(x, z),$$

wherein a set of equilibrium points of the power system meeting the algebraic nonsingular condition is determined by $$\varepsilon := \{(x,z) \in \mathcal{D}_G | f(x,z) = 0\}$$

$$\mathcal{D}_G := \mathcal{D} \cap G$$

$$G := \{(x,z) \in \mathbb{R}^n \times \mathbb{R}^m | g(x_2,z) = 0\} \quad (1\text{-}5)$$

where $0 = g(x_2, z)$ represents an algebraic constraint, and G is a set of points meeting the algebraic constraint.

6. The method according to claim 5, wherein determining the synchronization convergence region comprises:

determining, by the electronic device, a critical energy value of the synchronization energy function;

determining, by the electronic device, a level set of the critical energy value; and determining, by the electronic device, the synchronization convergence region based on the level set.

7. The method according to claim 6, wherein the level set is defined as:

$$\mathcal{V}_l^{-1} := \{(x,z) \in \mathbb{R}^n \times \mathbb{R}^m | \mathcal{V}(x,z) \leq l\} \cap G$$

where $\mathcal{V}_l^{-1}$ is the level set, and l is the critical energy value.

8. The method according to claim 6, wherein determining whether the power system is transient stable comprises:

determining, by the electronic device, a synchronous energy value corresponding to the initial value of the power system after fault based on the synchronization energy function;

in response to the synchronous energy value being not greater than the critical energy value, determining, by the electronic device, that the power system is transient stable; and in response to the synchronous energy value being greater than the critical energy value, determining, by the electronic device, that the power system is transient unstable.

9. The method according to claim 1, wherein determining whether the power system is transient stable comprises:

in response to the initial value of the power system after fault being in the synchronization convergence region, determining, by the electronic device, that the power system is transient stable; and in response to the initial value of the power system after fault being not in the synchronization convergence region, determining that, by the electronic device, the power system is transient unstable.

10. An electronic device, comprising:

a processor; and a memory stored with instructions executable by the processor;

wherein the processor is configured to:

determine a synchronous energy function corresponding to a power system model;

determine a synchronization convergence region based on the synchronous energy function;

determine whether the power system is transient stable based on an initial value of the power system after fault and the synchronization convergence region; and adjust parameters of the power system in response to determining that the power system is transient unstable, so that the power system is enabled to be transient stable;

wherein the processor is further configured to:

determine the synchronous energy function based on state variables and algebraic variables of the power system, wherein the synchronous energy function meets the formula of $$\alpha(\|\eta(x,z)\|) \leq \mathcal{V}(x,z) \leq \beta(\|\xi(x,z)\|)$$

$$\dot{\mathcal{V}}(x,z) \leq -\gamma(\|\xi(x,z)\|)$$

$$\|h(x,z)\| \leq c\|\eta(x,z)\|,$$

where $\mathcal{V}(x,z)$ is a continuously differentiable synchronous energy function at $\mathcal{V} : \mathbb{R}^n \times \mathbb{R}^m \to \mathbb{R}$ for $(x,z) \in \mathcal{D}_G$, x is the state variables of the power system, z is the algebraic variables of the power system, $\mathbb{R}^n$ is a n dimensional Euclidean space, $\mathbb{R}^m$ is a m dimensional Euclidean space; η( ) and ξ( ) re vector functions meeting η: $\mathbb{R}^n \times \mathbb{R}^m \to \mathbb{R}^{n_\eta}$ and ξ: $\mathbb{R}^n \times \mathbb{R}^m \to \mathbb{R}^{n_\xi}$; each of α( ), β( ) and γ( ) is a $\mathcal{K}$-class function; c is a constant greater than or equal to 0, h represents a continuously differentiable function at a set $\mathcal{D} \subset \mathbb{R}^n \times \mathbb{R}^m$ and $$\frac{d}{dt}z = h(x, z),$$

the set $\mathcal{D}$ is a connected open set and meets an algebraic nonsingular condition,
where the $\mathcal{K}$-class function is a continuous function $\alpha$: $[\theta, a) \to [0, \infty)$, and $\alpha(0)=0$ when the continuous function increases monotonically.

11. The electronic device according to claim 10, wherein the processor is further configured to:
   determine the power system model; and
   determine the state variables of the power system based on the power system model.

12. The electronic device according to claim 11, wherein the power system model is determined by the formula of $$\begin{cases} \dot{x}_1 = f_1(x_1, x_2, z) \\ \dot{x}_2 = f_2(x_1, x_2, z) \\ 0 = g(x_2, z) \end{cases}$$

$$z = col(\theta, V) \in \mathbb{R}^m$$

$$x_1 \in \mathbb{R}^{n_1}, x_2 \in \mathbb{R}^{n_2},$$

where $x_1$ and $x_2$ represent sub-state variables of the power system, $\mathbb{R}^{n_1}$ is a $n_1$ dimensional Euclidean space, $\mathbb{R}^{n_2}$ is a $n_2$ dimensional Euclidean space, z is algebraic variables of the power system, $\theta$ is a phase angle of each node in the power system, V is a voltage amplitude of each node in the power system; the function col( ) is a column vector splicing function, $f_1(\ )$, $f_2(\ )$ and $g(\ )$ re quadratic continuous differentiable functions.

13. The electronic device according to claim 12, wherein the processor is further configured to:
   determine the state variables of the power system based on the sub-state variables of the power system with the formula of $$x := col(x_1, x_2) \in \mathbb{R}^n$$

$$n = n_1 + n_2$$

$$col(x_1, x_2) = (x_1^T, x_2^T)^T,$$

where x is the state variables of the power system and $\mathbb{R}^n$ is a n dimensional Euclidean space.

14. The electronic device according to claim 10, wherein the function h( ) s defined as:

$$h(x, z) := -\left(\frac{\partial g}{\partial z}(x_2, z)\right)^{-1} \frac{\partial g}{\partial x_2}(x_2, z) f_2(x, z),$$

wherein a set of equilibrium points of the power system meeting the algebraic nonsingular condition is determined by $$\varepsilon := \{(x,z) \in \mathcal{D}_G | f(x,z) = 0\}$$

$$\mathcal{D}_{G'} := \mathcal{D} \cap G$$

$$G := \{(x,z) \in \mathbb{R}^n \times \mathbb{R}^m | g(x_2, z) = 0\} \quad (1\text{-}5)$$

where $0 = g(x_2, z)$ represents an algebraic constraint, and G is a set of points meeting the algebraic constraint.

15. The electronic device according to claim 14, wherein the processor is further configured to:
   determine a critical energy value of the synchronization energy function;
   determine a level set of the critical energy value; and
   determine the synchronization convergence region based on the level set.

16. The electronic device according to claim 15, wherein the level set is defined as:

$$\mathcal{V}_l^{-1} := \{(x,z) \in \mathbb{R}^n \times \mathbb{R}^m | \mathcal{V}(x,z) \leq l\} \cap G,$$

where $\mathcal{V}_l^{-1}$ is the level set, and l is the critical energy value.

17. The electronic device according to claim 15, wherein the processor is further configured to:
   determine a synchronous energy value corresponding to the initial value of the power system after fault based on the synchronization energy function;
   in response to the synchronous energy value being not greater than the critical energy value, determine that the power system is transient stable; and
   in response to the synchronous energy value being greater than the critical energy value, determine that the power system is transient unstable.

18. The electronic device according to claim 10, wherein the processor is further configured to:
   in response to the initial value of the power system after fault being in the synchronization convergence region, determine that the power system is transient stable; and
   in response to the initial value of the power system after fault being not in the synchronization convergence region, determine that the power system is transient unstable.

* * * * *